(12) United States Patent
Edkins (10) Patent No.: US 8,484,921 B2
(45) Date of Patent: Jul. 16, 2013

(54) RAIN-SCREEN APPARATUS AND METHOD

(75) Inventor: David John Edkins, Auckland (NZ)

(73) Assignee: James Hardie Technology Limited, Dublin (IE)

( * ) Notice: Subject to any disclaimer, the term of this patent is extended or adjusted under 35 U.S.C. 154(b) by 1457 days.

(21) Appl. No.: 10/563,406

(22) PCT Filed: Jul. 5, 2004

(86) PCT No.: PCT/IB2004/002202
§ 371 (c)(1),
(2), (4) Date: Jan. 4, 2006

(87) PCT Pub. No.: WO2005/003478
PCT Pub. Date: Jan. 13, 2005

(65) Prior Publication Data
US 2006/0156638 A1 Jul. 20, 2006

(30) Foreign Application Priority Data
Jul. 4, 2003 (AU) ............................... 2003903440

(51) Int. Cl.
*E04B 5/00* (2006.01)
(52) U.S. Cl.
USPC .......... 52/408; 52/302.1; 52/309.9; 52/405.2; 52/405.4; 52/508; 52/506.01
(58) Field of Classification Search
USPC ............ 52/302.3, 302.1, 309.9, 404.1, 405.2, 52/405.4, 407.1, 407.2, 407.3, 404.5, 408, 52/508, 506.01, 281, 468, 483.1; 135/95, 135/97
See application file for complete search history.

(56) References Cited

U.S. PATENT DOCUMENTS

| | | | |
|---|---|---|---|
| 2,645,824 A | 7/1953 | Titsworth | |
| 2,724,465 A | 11/1955 | Krauss | |
| 3,568,391 A | 3/1971 | Conway | |
| 3,672,108 A | 6/1972 | Conway | |
| 3,760,544 A * | 9/1973 | Hawes et al. | 52/468 |
| 3,998,016 A | 12/1976 | Ting | |
| 4,114,334 A * | 9/1978 | Thoren | 52/302.3 |
| 4,286,420 A * | 9/1981 | Pharmakidis | 52/404.1 |
| 4,655,018 A * | 4/1987 | Pardo | 52/302.3 |
| 4,765,107 A | 8/1988 | Ting | |
| 5,027,572 A | 7/1991 | Purcell et al. | |
| 5,230,189 A * | 7/1993 | Sourlis | 52/169.5 |
| 5,410,852 A * | 5/1995 | Edgar et al. | 52/408 |
| 5,596,851 A | 1/1997 | Ting | |
| 5,761,864 A * | 6/1998 | Nonoshita | 52/302.3 |
| 5,826,388 A | 10/1998 | Irving | |
| 6,233,890 B1 | 5/2001 | Tonyan | |

(Continued)

FOREIGN PATENT DOCUMENTS

| | | |
|---|---|---|
| CA | 1298454 | 4/1992 |
| CA | 2204044 | 7/1999 |

(Continued)

*Primary Examiner* — Joshua J Michener
*Assistant Examiner* — Chi Q Nguyen
(74) *Attorney, Agent, or Firm* — Knobbe Martens Olson & Bear, LLP (57) ABSTRACT

A rain-screen apparatus including a substantially rigid air barrier (10) adapted for attachment to a building structure, a rain-screen panel (20) adapted for attachment over the air barrier, a spacing member adapted to provide a clearance space (14) between the air barrier and the rain-screen panel and sealing means adapted to provide substantial pressure equalization between within the clearance space.

5 Claims, 13 Drawing Sheets

U.S. PATENT DOCUMENTS

| | | | |
|---|---|---|---|
| 6,279,284 B1 * | 8/2001 | Moras | 52/408 |
| 6,401,394 B2 * | 6/2002 | Nozaki | 49/377 |
| 6,619,004 B2 | 9/2003 | Loper | |
| 6,698,144 B1 * | 3/2004 | Larson | 52/202 |
| 6,745,531 B1 * | 6/2004 | Egan | 52/302.1 |
| 6,918,218 B2 * | 7/2005 | Greenway | 52/267 |
| 7,591,109 B2 * | 9/2009 | Rotter | 52/198 |
| 2002/0029535 A1 | 3/2002 | Loper | |
| 2002/0088189 A1 | 7/2002 | Honda | |
| 2009/0031656 A1 * | 2/2009 | Hunt-Hansen et al. | 52/344 |

FOREIGN PATENT DOCUMENTS

| | | |
|---|---|---|
| DE | 3735786 | 7/1988 |
| FR | 2628775 | 9/1989 |
| GB | 2382827 | 6/2003 |
| WO | WO 96/24734 | 8/1996 |

\* cited by examiner

RAIN-SCREEN APPARATUS AND METHOD

FIELD OF THE INVENTION

This invention relates to exterior cladding systems for both residential and commercial buildings and in particular a rain-screen apparatus, system and methods of manufacture and assembly.

The invention is directed particularly, but not solely to a rain-screen system having a means of pressure equalization with the external environment.

BACKGROUND OF THE INVENTION

Any discussion of the prior art throughout the specification is provided so that the invention and the advantages of it may be better understood in an appropriate technical context, but should in no way be considered as an admission that such prior art is widely known or forms part of common general knowledge in the field.

Generally, when applying cladding or a rain-screen to a building frame, an air barrier layer is first placed upon the frame. A series of battens are then placed atop the air barrier and attached to the frame underneath. Finally, a cladding material is typically fixed to the battens.

The space behind the cladding is usually configured to allow ventilation and removal of any water that may enter the wall cavity. Water trapped in a wall cavity if allowed to remain or accumulate, can affect the durability of frame and cladding components.

In known cladding or rain-screen systems, a waterproof membrane such as housewrap, sarking or building paper is the sole air barrier placed upon the building frame. Entry of water, particularly wind driven rain, into buildings can be a problem when such systems are used in high wind areas or on the upper stories of low to medium rise buildings. This is because housewraps, sarking materials and the like are flexible and may deform when exposed to wind or more generally when a pressure differential exists on opposite sides of the air barrier; allowing rain or liquid water to enter the wall behind the air barrier, particularly where adjacent sheets of sarking join or overlap, and thereby become trapped within the wall framing with little hope of removal.

What is needed is a cladding or rain-screen system for buildings that will better protect the building frame from water ingress during periods of wind driven rain.

It is an object of the present invention to overcome or substantially ameliorate one or more of the disadvantages of the prior art, or at least to provide a useful alternative.

It is a further object of the invention in its preferred form to provide an improved rain-screen system and method that are less susceptible to the ingress of water during periods of wind driven rain.

It is a further object of the invention in its preferred form to provide an air barrier for a wall cladding system that is suitable for use on low to mid-rise buildings.

SUMMARY OF THE INVENTION

In one aspect, the invention broadly provides a rain-screen apparatus including:
a substantially rigid air barrier adapted for attachment to a building structure;
a rain-screen panel adapted for attachment over the air barrier;
a spacing member adapted to provide a clearance space between the air barrier and the rain-screen panel; and
sealing means adapted to provide substantial pressure equalisation between the clearance space and the external atmosphere.

Preferably, the rain-screen apparatus includes an air vent to atmosphere from the pressure equalised space to allow air pressure within the space to equalise with air pressure externally of the space. Preferably, the clearance space is sealed by the sealing means on the top and sides, and vented at the bottom, to prevent ingress wind forced rain.

Preferably, the rain-screen apparatus is suitable for use on building frames with studs placed at predetermined intervals so as to resist water ingress with wind pressure at up to a predetermined level. More preferably, the stud placement is between approximately 400 and 610 mm center to center. The predetermined wind pressure is preferably greater than approximately 1 kPa and less than approximately 4.5 kPa.

The substantially rigid air barrier may be comprised of any polymeric or cellulosic or cementitious material suitably reinforced to provide the degree of rigidity required to resist water ingress when incorporated into a rain-screen apparatus and exposed to a predetermined wind pressure according to a standardized wind test.

In one preferred embodiment, the rigid air barrier is in the form of a panel. Preferably, the air barrier panel is between 2 mm and around 15 mm in thickness, and more preferably 5 mm-7 mm thick. More preferably, the air barrier is a panel comprising oriented strand-board, plywood, metal or expanded polymeric foam, or a combination of these materials. Most preferably, the panel comprises fibre cement.

In one preferred embodiment, the air barrier is a panel that substantially prevents liquid water from passing therethrough by attachment of a sheet of polymeric or substantially water repellent cellulosic material to the exterior surface of the panel. Alternatively, the air barrier is a panel having at least the exterior side treated with a material that repels liquid water. Alternatively, the air barrier is panel that contains a water repellent material.

In another embodiment, the rigid air barrier is in the form of at least one thin sheet comprising a polymeric or substantially water repellent cellulosic material, the sheet having relatively rigid reinforcing means attached thereto. In one embodiment, the thin sheet is a substantially polyolefinic material having relatively rigid reinforcing means comprising a mesh of fibreglass, metal or polymeric material laminated to at least one surface of the thin sheet. Alternatively, the relatively rigid reinforcing means may include a series of battens or the like laminated to at least one surface of the thin sheet.

The rain-screen may be of any exterior cladding known in the art. Preferably the rain-screen is in the form of a panel comprising a cementitious material, oriented strand-board, plywood, metal, polymeric foam or a combination of these. More preferably the rain-screen panel may be between approximately 2 mm-11 mm thick, more preferably 7-11 mm thick, and most preferably around 9 mm thick. Preferably, the rain-screen panel comprises fibre cement sheet.

In a further aspect, the invention broadly provides a rain-screen air barrier joint seal for sealing a joint between at least two adjacent air barrier panels of rain-screen apparatus, the seal including a sealing strip of a substantially resilient material having a first surface and a second surface opposite to the first surface, the first surface being adapted to contact the panels, and at least one batten provided in use over the second surface of the seal strip, the batten being in contact with the second surface so as to maintain the first surface of the strip in contact with the region of the air barrier adjacent to the joint.

Preferably, the first surface has an adhesive provided thereon. Preferably the second surface has an adhesive provided thereon.

In a further aspect, the invention broadly provides a rain-screen flashing including a first edge portion adapted to be located on or adjacent to a lower edge of an air barrier panel of rain-screen apparatus, a second edge portion adapted to be located on or adjacent to an upper region of a rain-screen panel provided below the air barrier panel, and a central portion which is contiguous with the first and second edge portions and is provided at a substantially obtuse angle to the first and second edge portions.

Preferably, the central portion slopes downwardly to allow water to drain over the central portion and exterior to the rain-screen panel.

In a further aspect, the invention broadly provides a rain-screen vent for a rain-screen apparatus having an air barrier panel and a rain-screen panel and a space therebetween, the vent including a first wall adapted for location on or adjacent to the air barrier panel, a second wall adapted to be located on or adjacent to an internal surface of the rain-screen panel, and a central portion connected between the first and second walls, the central portion having one or more apertures therein, the one or more apertures allowing liquid to drain from the space and also allowing ingress of air into the space.

In a further aspect, the invention broadly provides a rain-screen seal construction including a batten for location on an air barrier of a rain-screen apparatus, a sealing member having a base and at least two lips projecting from the base, the lips being spaced from each other, one lip being adapted to make a substantially sealing contact with a rear surface of a first rain-screen panel, and the second lip being adapted to make a substantially sealing contact with the rear surface of a second rain-screen panel, the second panel being located adjacent to the first panel.

In a further aspect, the invention broadly provides a method of constructing a rain-screen, the method including the steps of attaching a substantially rigid air barrier to an external side of a building frame, attaching one or more battens over an exterior surface of the substantially rigid air barrier, and attaching a rain-screen panel over at least one of the battens.

Preferably, the substantially rigid air barrier is in the form of a panel. Preferably the panel is between approximately 2-15 mm thick, and more preferably 5 mm-7 mm thick. The air barrier may be formed from any suitable material including cementitious material, oriented strand-board, plywood, metal, expanded polymeric foam or a combination of these. Most preferably, the panel is formed from fibre cement.

Preferably, the rain-screen is in the form of a panel comprising a cementitious material, oriented strand-board, plywood, metal, polymeric foam or a combination of these. More preferably the rain-screen panel may be between approximately 2 mm-11 mm thick, more preferably 7-11 mm thick, most preferably 9 mm thick. Most preferably, the rain-screen panel comprises fibre cement.

In a further aspect, the invention broadly provides a method for constructing a rain-screen, said method including the steps of:
  providing a substantially rigid air barrier panel;
  coating the panel with a water resistant material;
  attaching one or more battens over an exterior surface of the air barrier panel;
  fixing a rain-screen panel over the battens so that the rain-screen panel is spaced from the air barrier panel; and
  coating the exterior surface of the rain-screen panel with a substantially water resistant material.

Preferably, one or both of the panels may be fibre reinforced cement panels.

BRIEF DESCRIPTION OF THE DRAWINGS

Preferred embodiments of the invention will be described, with reference to the accompanying drawings, in which.

DESCRIPTION OF PREFERRED EMBODIMENT

Figure 1:
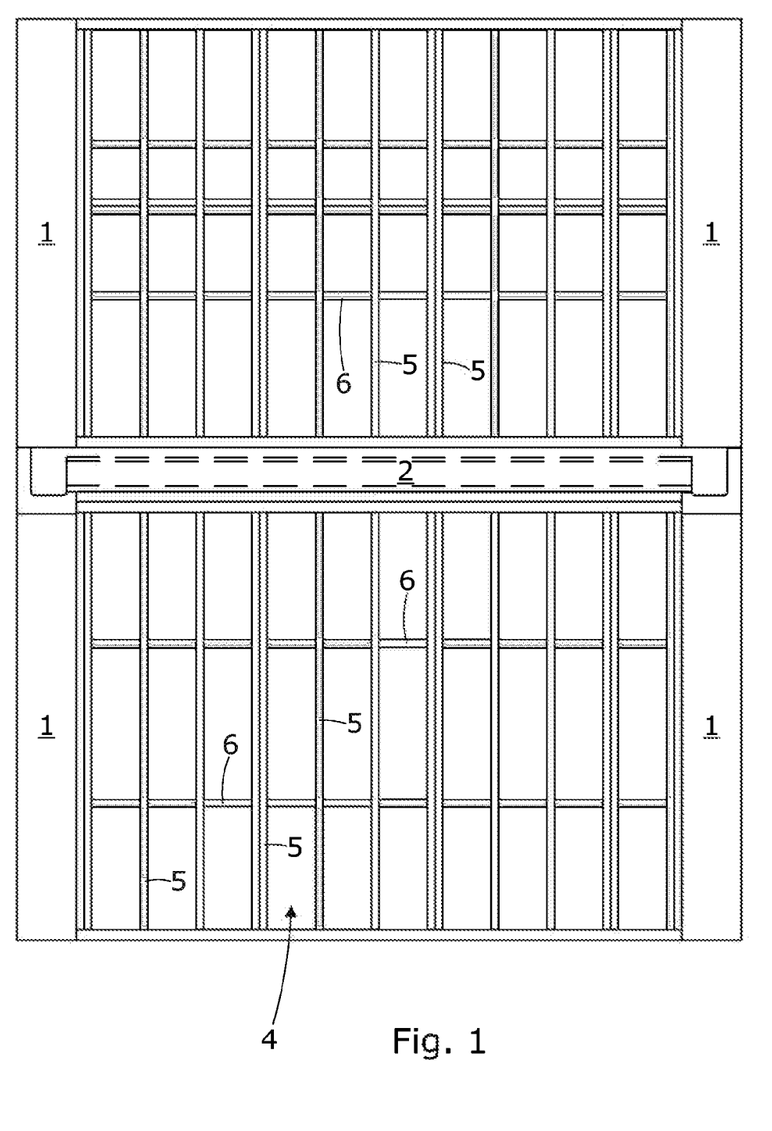
FIG. 1 is a front elevation of a two story building structure.

FIG. 1 shows a building structure, having structural concrete supports in the form of concrete columns 1 and a suspended concrete floor 2. Between the concrete structural supports, the framing generally referenced 4 is provided including studs 5 and nogs 6. In this example, the framing is timber but those skilled in the art will appreciate that other framing materials may be used, for example steel frame materials. The structure in FIG. 1 represents an exposed exterior structure of a building, preferably but not necessarily a commercial building.

Figure 2:
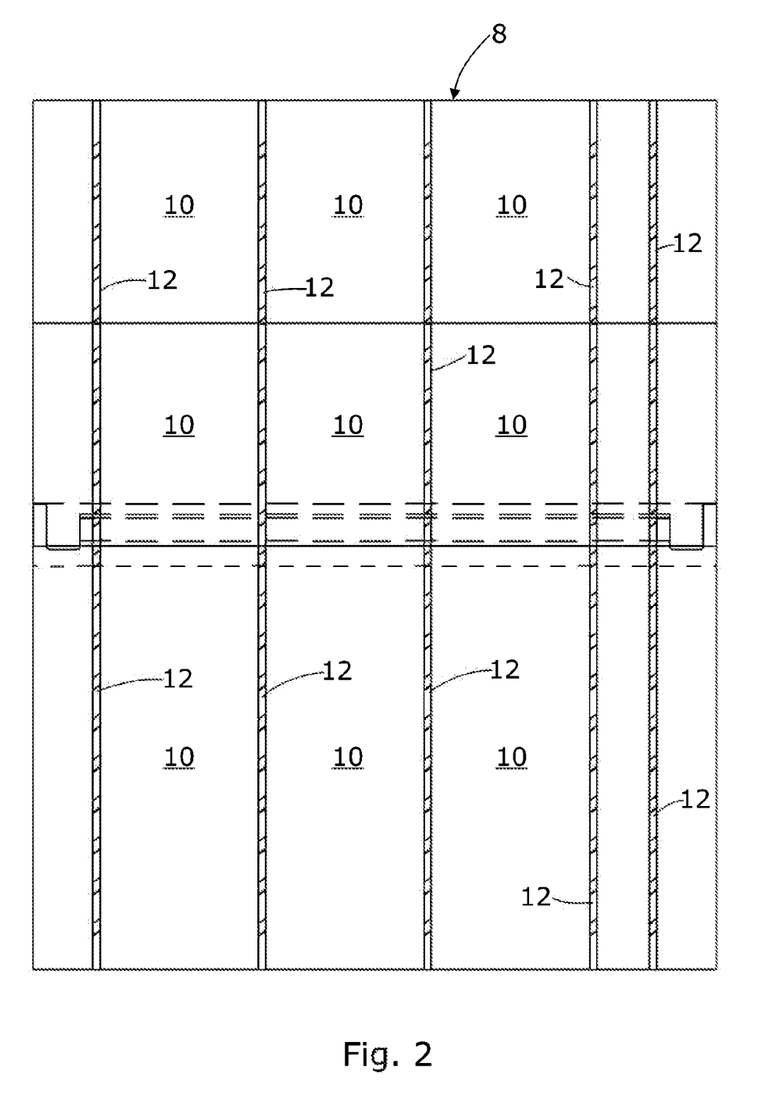
FIG. 2 is a front elevation of the structure of FIG. 1 including an air barrier affixed thereto.

Turning to FIG. 2, the first step in cladding the framing so as to provide a rain-screen according to the invention is illustrated in which an air barrier generally referenced 8 is provided. In the example illustrated, a number of separate panels are affixed to the framing in order to create the air barrier. The number of panels may vary, for example a single panel could be used and the number of panels will vary depending upon the dimensions of the panels that are used and the area of the structure required to be covered. In FIG. 2, 12 air barrier panels, each referenced 10 are shown. The panels are preferably fibre cement panels (for example Hardiflex® manufactured by James Hardie Building Products Pty. Ltd). However, panels of wood, wood composite (such as oriented strand-board or plywood), metal, expanded polymeric foam or composite panels comprising these materials will also make suitable rigid air barrier. At the vertical joints between air barrier panels 10, a sealing strip 12 is provided as will be described in more detail below.

Alternatively, the rigid air barrier is in the form of at least one thin sheet comprising a polymeric or substantially water repellent cellulosic material, said sheet having a relatively rigid reinforcing means attached thereto. In one embodiment, the thin sheet is a substantially polyolefin material having a relatively rigid reinforcing means comprising a mesh of fibreglass, metal or polymeric material laminated to at least one surface of the thin sheet. Alternatively, the relatively rigid reinforcing means is a series of battens or the like laminated to at least one surface of the thin sheet.

Figure 3:
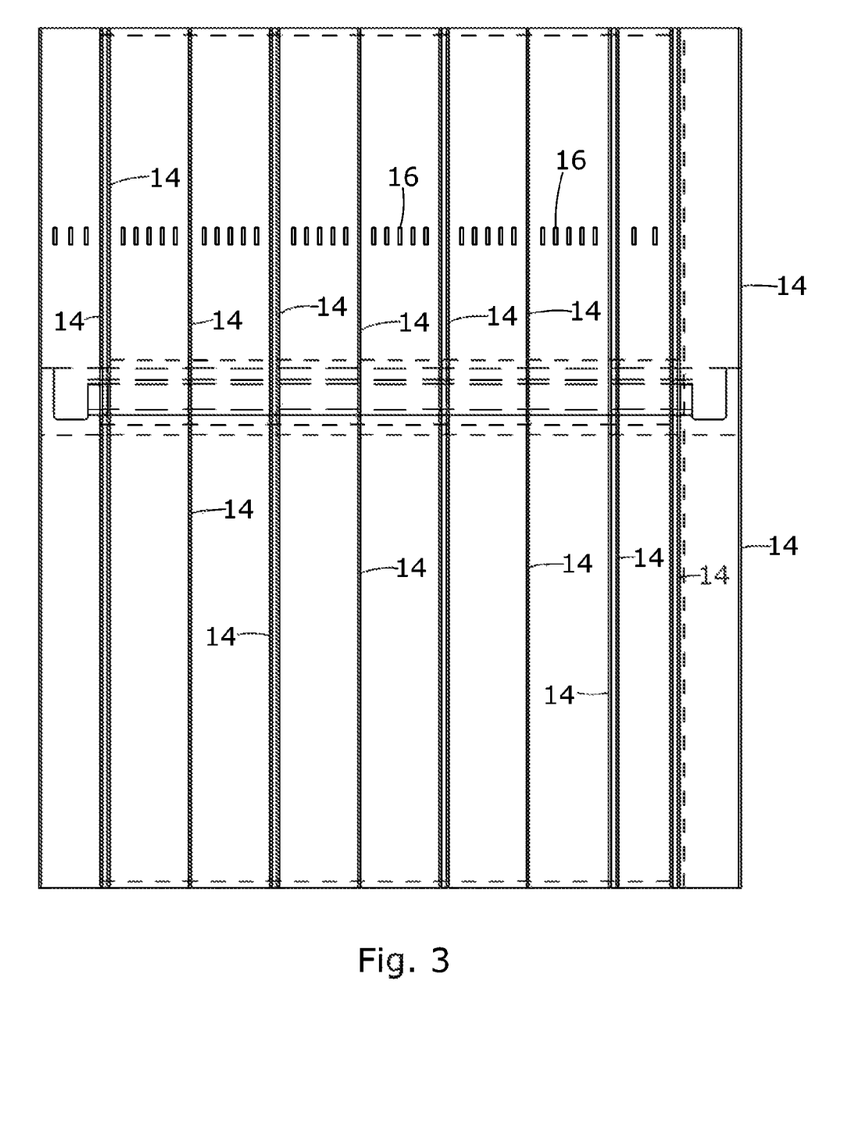
FIG. 3 is an elevation of FIG. 2 further including battens provided over the air barrier.

In FIG. 3, spacers in the form of battens 14 are shown placed over the air barrier. In this example, the battens are preferably constructed from a treated timber material and are preferably 50 mm×20 mm in cross section. Those skilled in the art will appreciate that other materials may be used to provide spacers, for example comprised of metal or polymeric composite Further battens or spacers 16 may also be provided if necessary.

Figure 4:
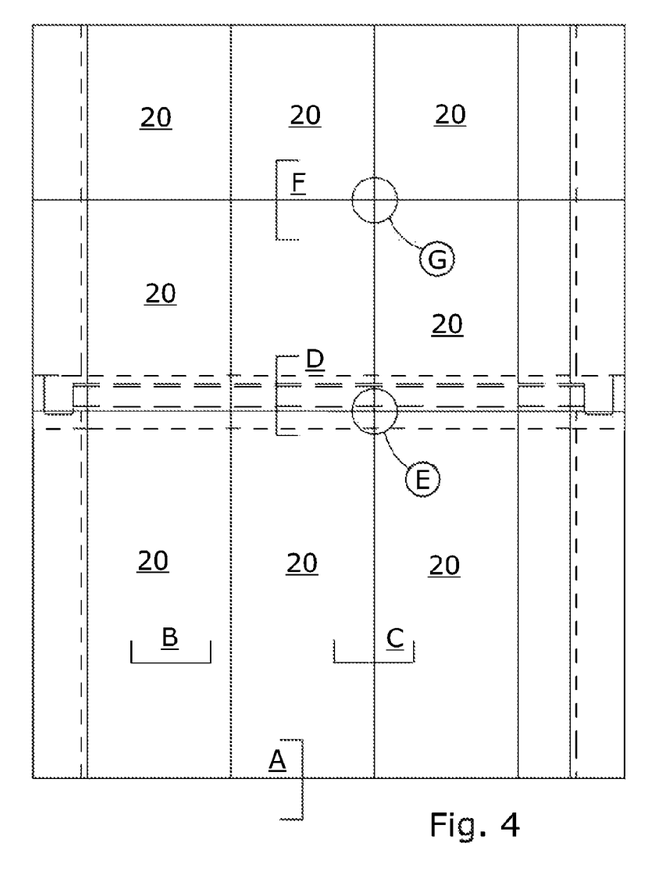
FIG. 4 is a front elevation of the structure of FIG. 3 and further including a rain-screen provided over the battens.
Figure 5:
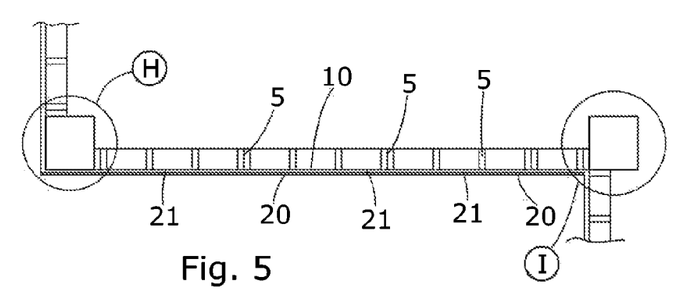
FIG. 5 is a plan view of FIG. 4.

In FIG. 4, the structure of FIG. 3 is shown with rain barrier panels 20 affixed over the battens so that there are a number of spaces provided between the rain-screen wall and the air barrier. FIG. 5 shows the partial structure in plan view in which spaces between the air barrier and rain-screen panels are referenced 21. In FIGS. 4 and 5, the regions labelled A-H are shown in greater detail than the remaining figures.

Figure 6:
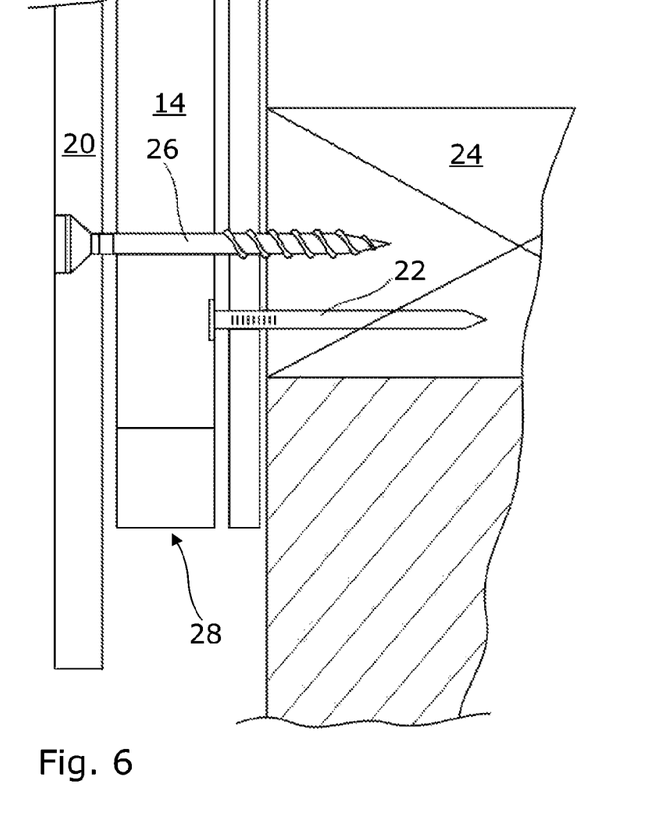
FIG. 6 is a side elevation and cross section of detail of A of FIG. 4.
Figure 6A:
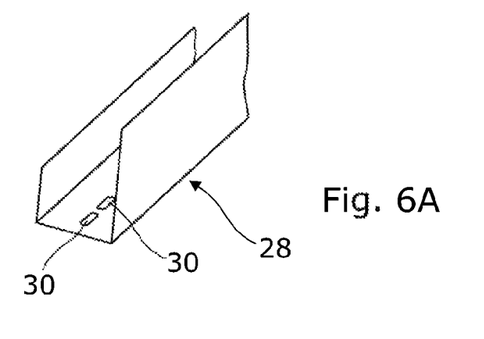
FIG. 6A is an isometric sketch of a vent.

Detail A is shown in FIG. 6 from which it can be seen that the air barrier panel 10 is affixed at its lower edge by a fastener such as nail 22 to the bottom plate 24 of the framing assembly. An appropriate screw such as a 65 mm×10 g wood thread screw 26 affixes the rain-screen panel, the batten and the air barrier panel to the bottom plate. The nail 22 may also hold a vent strip 28 in location at the base of the screen. The rain barrier panel 20 preferably comprises a fibre reinforced cement panel such as that marketed under the trademark Titan™ or Exotec™. The preferred thickness of panel 20 is 7-11 mm, most preferably 9 mm. In FIG. 6A the vent strip is shown in greater detail as an isometric sketch which reveals it has a number of apertures 30 in the base which have sufficient dimension to allow any water such as rain water in the space between the air barrier panels 10 and the rain barrier panels 20 to drain from that space, while also allowing air entry to the space so that the space may be pressure equalised in use and therefore resist ingress of water such as wind driven rain.

Figure 7:
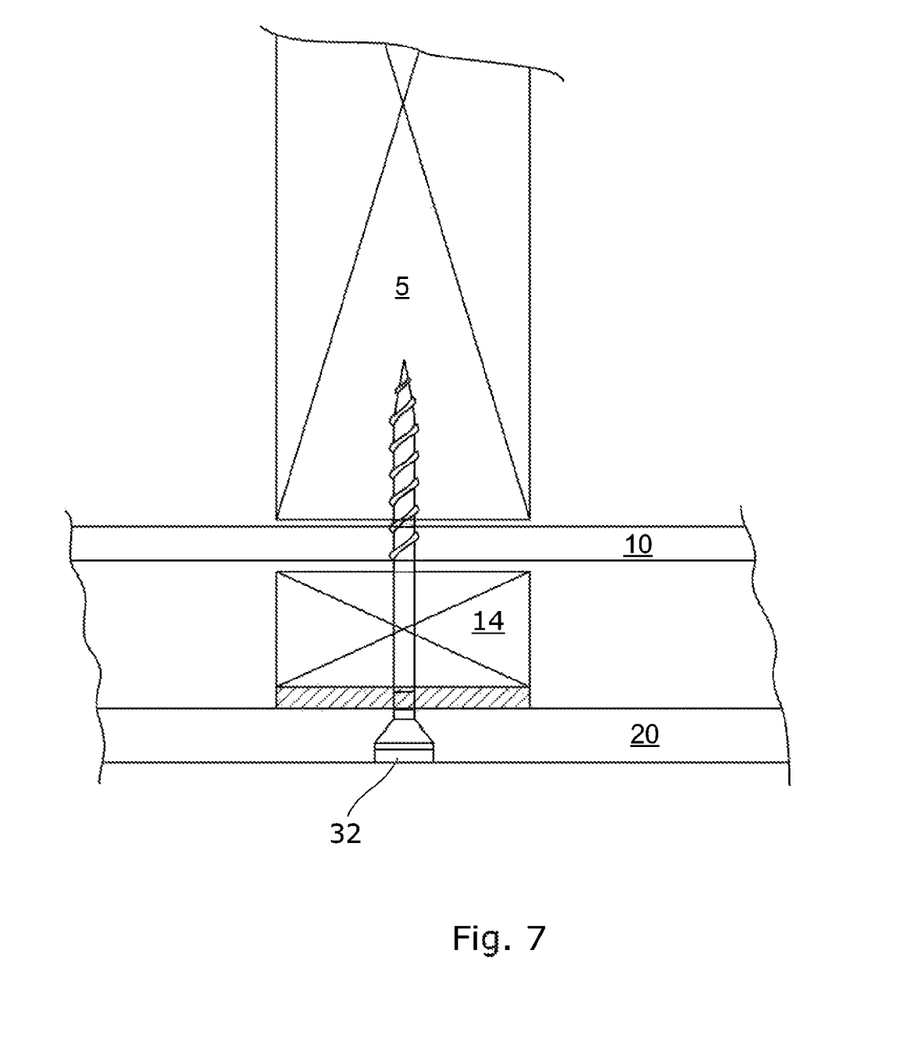
FIG. 7 is a plan view and cross section of detail B of FIG. 4.

Turning to FIG. 7, detail B of FIG. 4 is shown in which the connection of the rain-screen arrangement to a stud 5 is shown. A screw or similar fastener 32 connects screens the air barrier panels 10 and the rain barrier panels 20 and a batten 14 securely to the stud.

Figure 8:
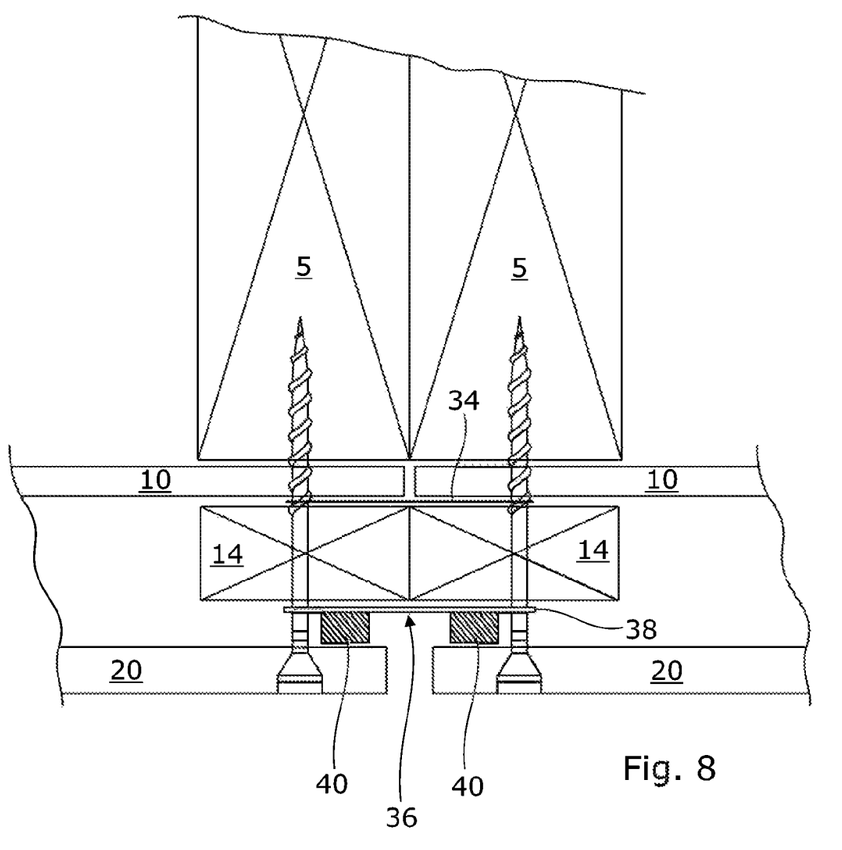
FIG. 8 is a plan view and cross section of detail C of FIG. 4.

In FIG. 8, a vertical joint between horizontally adjacent panels of the screen arrangement is illustrated. A sealing strip 34, which is preferably 50 mm wide and constructed from a resilient material such as an appropriate plastics or rubber material is laid over the joint between the adjacent air barrier panels 10. The sealing strip 34 is preferably coated with an adhesive on either side to assist with location under attention about the joint. The battens 14 (which may alternatively comprise a single batten if desired) are provided directly over an upper surface of the sealing strip 34 so that one side of each batten holds the sealing strip securely in place.

On the other side of the battens 14, a further sealing strip 36 is provided having a base 38 and two projecting sealing lips 40 projecting from the base. One lip 40 engages with the rear surface of each of the rain-screen panels 20. The arrangement is such that a substantial seal is made between the side edges of each of the air barrier panels 10 and the rain barrier panels 20.

Figure 9:
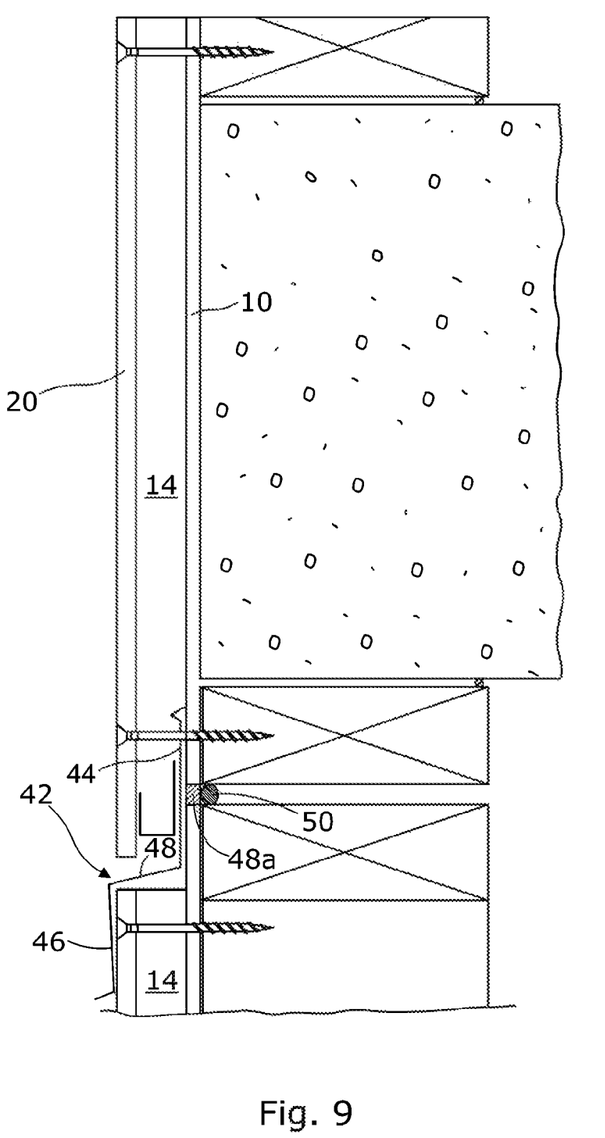
FIG. 9 is a side elevation and cross section of detail D of FIG. 4.

Turning to FIG. 9, detail D of FIG. 4 is shown. In this figure, it can be seen that a flashing 42 is provided which has a first edge part 44 and a second edge part 46 for location on an air barrier panel and on an external surface of a rain-screen panel respectively. A central bridging portion 48 is angled at 90 degrees or more i.e. substantially obtusely to the edges 44 and 46. This provides a downwardly angled flow path, which allows any water within the spaces of the upper panels as shown in FIG. 9 to drain out from between those panels and on to the exterior of the lower rain-screen panel shown in the figure. As well as allowing drainage, the flashing 42 also assists with sealing or at least protecting the seal between the lower air barrier panel and lower rain-screen panel. A seal created by sealant 48a over a backing PEF rod 50 for sealing vertically adjacent air barrier panels is also shown.

Figure 10:
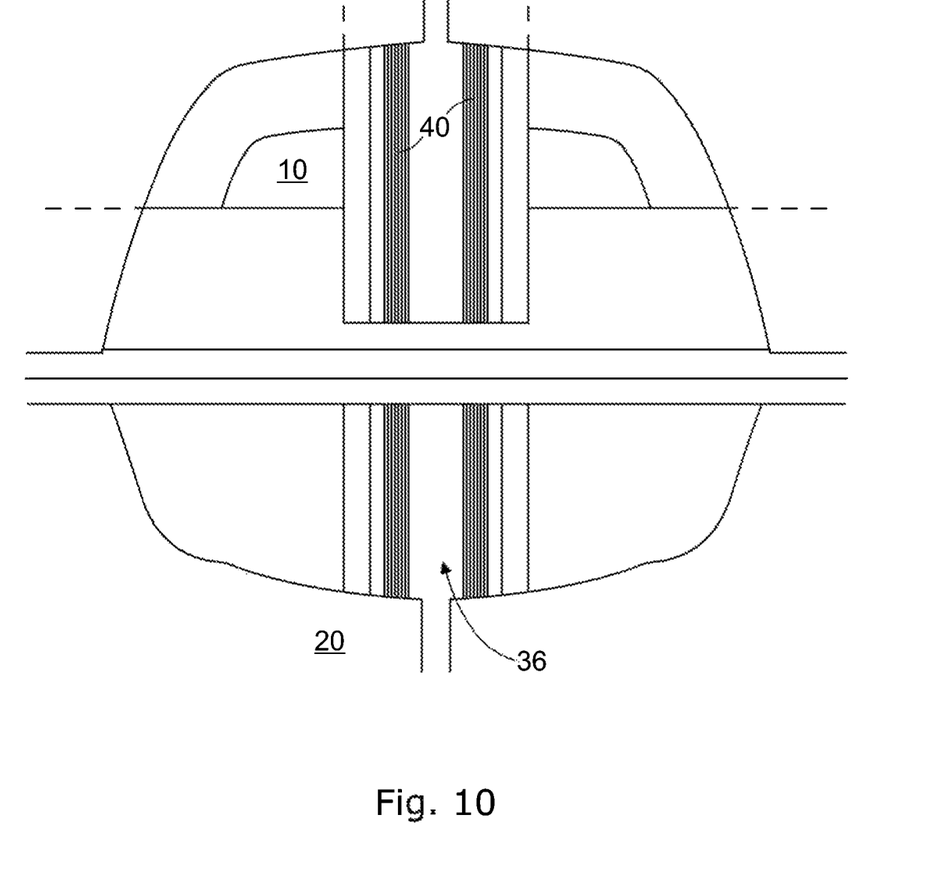
FIG. 10 is a partial elevation of FIG. 4 showing detail E.

In FIG. 10, detail E of FIG. 4 is shown which again shows the seal strip 36 described above.

Figure 11:
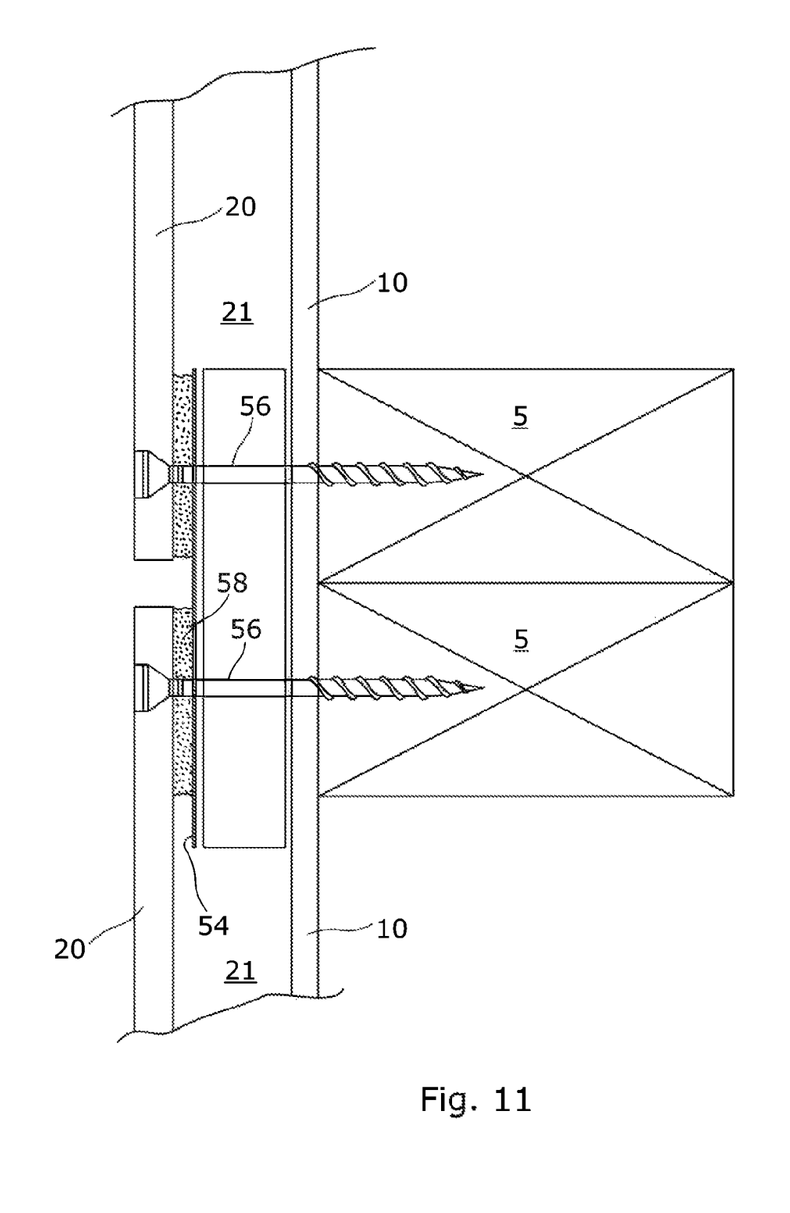
FIG. 11 is a side elevation and cross section showing detail F of FIG. 4.

In FIG. 11, which shows detail F of FIG. 4, a joint between vertically adjacent panels as shown a short support batten 16 is used together with an aluminium socket 54 which screws 56 penetrate. A sealant 58 such as that sold under the trademark Fosrock MS sealant or similar is used between socket 54 and the edges of rain-screen panels 20.

Figure 12:
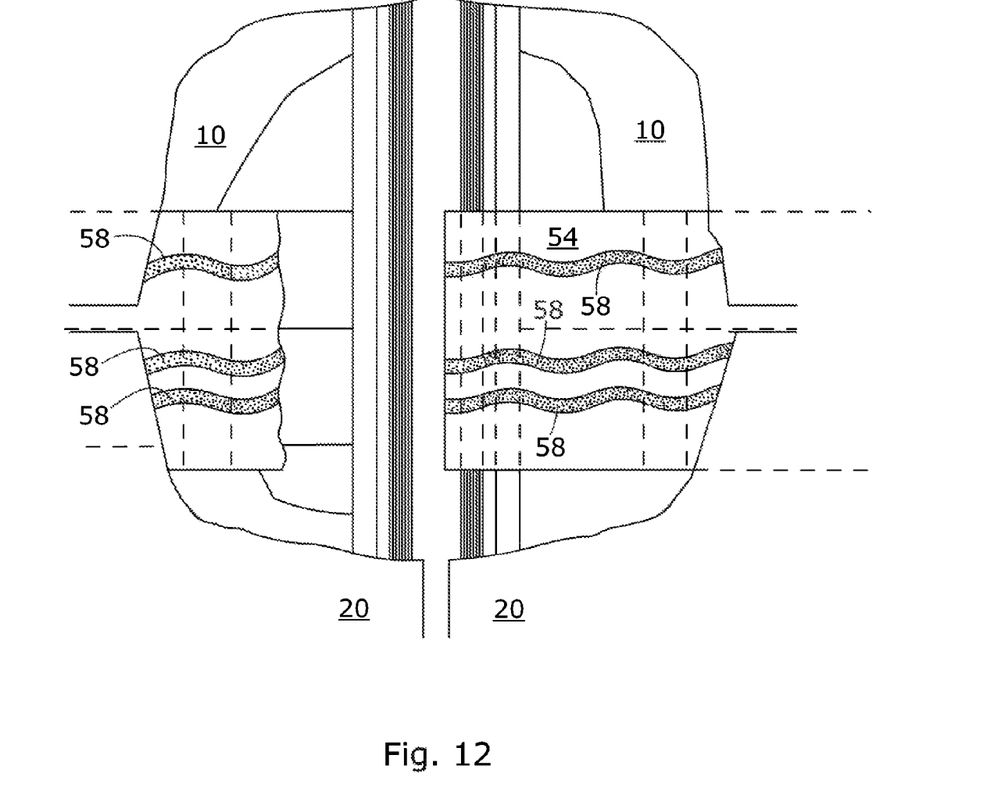
FIG. 12 is a partial elevation of FIG. 4 showing detail G.

In FIG. 12, the aluminium socket and sealant arrangement is shown in elevation in accordance with detail G of FIG. 4.

Figure 13:
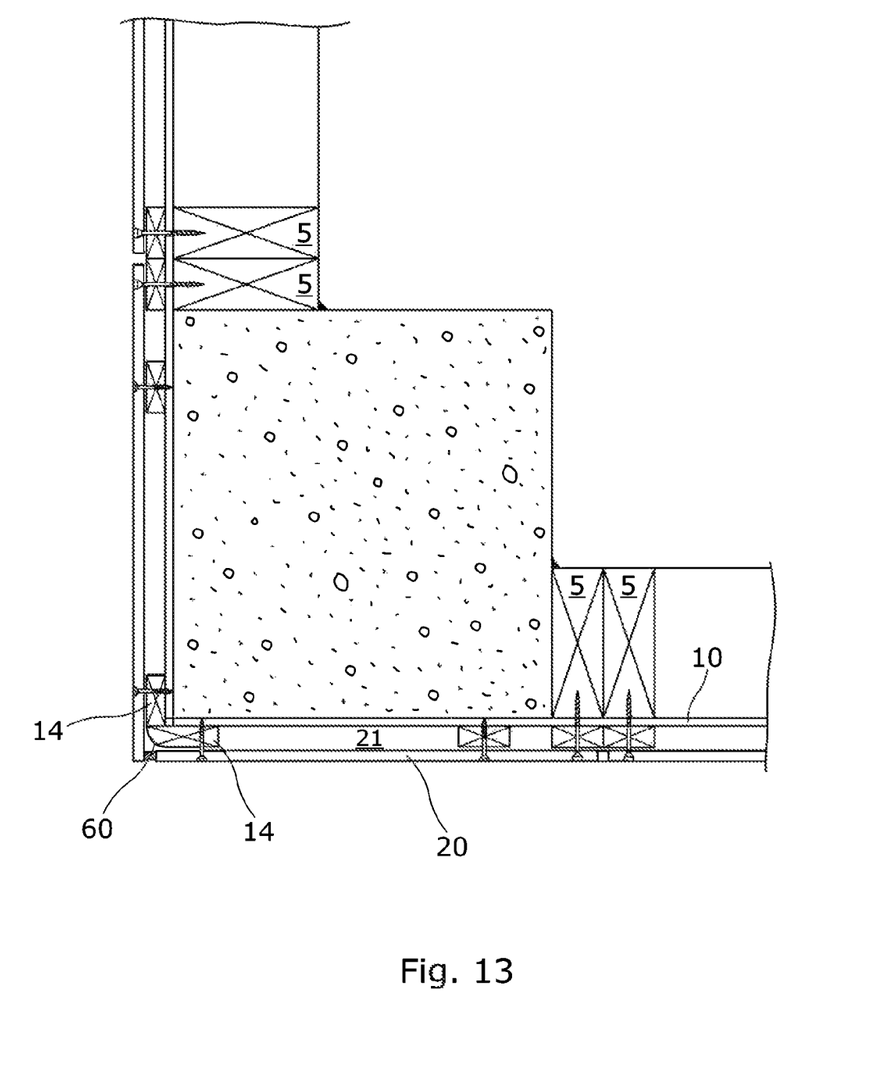
FIG. 13 is a sectional plan view showing detail H of FIG. 5.
Figure 14:
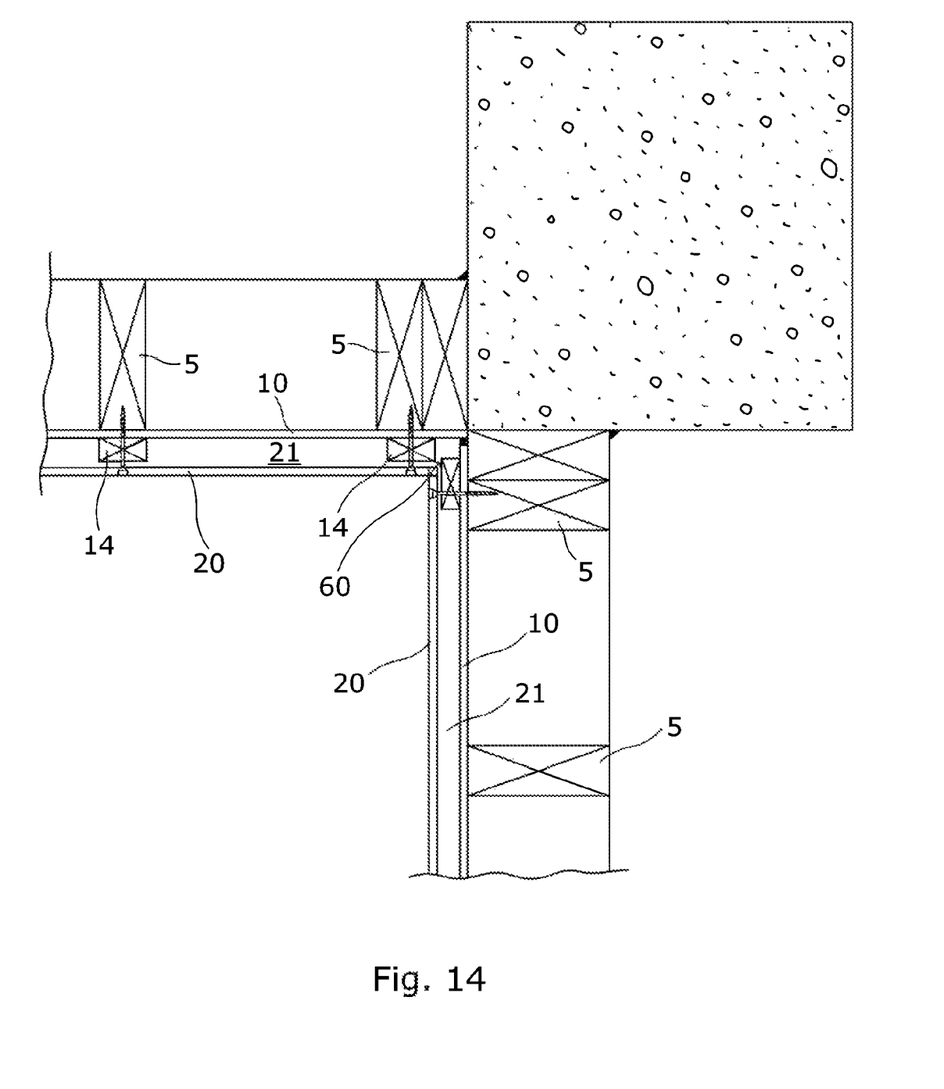
FIG. 14 is a plan view and cross section showing detail I of FIG. 5.

In FIG. 13, an external corner detail is shown in which it can be seen that a sealing strip 60, for example an 80 mm wide strip of substantially resilient material such as butynol is provided. In FIG. 14, detail I of FIG. 5 is shown in which it can be seen that a sealing strip the same as or similar to that described above with reference to FIG. 13 may also be used to provide an appropriate seal at an internal corner.

The outer surface, i.e. the surface away from the framing, of the air barrier panels 10 is preferably coated with a substantially water resistant coating. Similarly, the exterior surface, i.e. the surface opposite battens 14 of rain-screen panels 20 is also preferably coated with a substantially water resistant coating.

From the foregoing it can be seen that an effective rain-screen system, particularly a pressure-equalized rain-screen, together with an effective sealing arrangement is provided. The sealing arrangement allows the spaces between air barrier and rainscreen panels to be effectively sealed along the side and upper edges while providing a vent at the lower edge. In this way, air pressure within the spaces is equalized with exterior pressure such as that from wind for example. Therefore, there is no pressure differential to force water such as raindrops carried by wind to enter the spaces behind the rain-screen. As a result, the rain-screen prevents rain from entering the building structure.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A rainscreen apparatus including: a substantially rigid air barrier adapted for attachment to a building structure; a rainscreen panel adapted for attachment over the air barrier; at least one batten for a spacing member adapted to provide a clearance space between the air barrier and the rainscreen panel wherein the clearance space has a width of at least 20 mm; a sealing means adapted to provide substantial pressure equalization within the clearance space; and a rainscreen seal construction including a batten for location on the air barrier, a sealing member having a base and at least two lips projecting from said base, said lips being spaced from each other, a first lip being adapted to make a substantially sealing contact with a rear surface of a first rainscreen panel, and the second lip being adapted to make a substantially sealing contact with the rear surface of a second rainscreen panel, said second panel being located adjacent to the first panel.

2. A rainscreen apparatus according to claim 1 wherein said air barrier includes a sheet comprising a poly polymeric or substantially water repellent cellulosic material and a polyolefin material having a relatively rigid reinforcing means including a mesh of fiberglass, metal or polymeric material laminated to at least one surface of said sheet.

3. A rainscreen apparatus according to claim 1 wherein said air barrier includes a polyolefin material having a relatively rigid reinforcing means including a series of battens laminated to at least one surface of said sheet.

4. A rainscreen apparatus according to claim 1 wherein said first surface has an adhesive provided thereon.

5. A rainscreen apparatus according to claim 1 wherein said second surface has an adhesive provided thereon.

\* \* \* \* \*